(12) United States Patent
Larsson et al.

(10) Patent No.: US 9,791,057 B2
(45) Date of Patent: Oct. 17, 2017

(54) VALVE FOR AN INDOOR TEMPERATURE REGULATING SYSTEM AND AN AIR TEMPERATURE CONDITIONING UNIT COMPRISING SUCH VALVE

(71) Applicant: ESBE AB, Reftele (SE)

(72) Inventors: Per-Ake Larsson, Vastra Amtervik (SE); Torbjorn Lonkvist, Skeppshult (SE)

(73) Assignee: ESBE AB, Reftele (SE)

( * ) Notice: Subject to any disclaimer, the term of this patent is extended or adjusted under 35 U.S.C. 154(b) by 0 days.

(21) Appl. No.: 15/038,966

(22) PCT Filed: Nov. 19, 2014

(86) PCT No.: PCT/SE2014/051382
§ 371 (c)(1),
(2) Date: May 24, 2016

(87) PCT Pub. No.: WO2015/076740
PCT Pub. Date: May 28, 2015

(65) Prior Publication Data
US 2016/0348797 A1    Dec. 1, 2016

(30) Foreign Application Priority Data

Nov. 25, 2013 (SE) ...................................... 1330150
Sep. 3, 2014 (SE) ...................................... 1430118

(51) Int. Cl.
*F16K 11/074* (2006.01)
*F24D 19/10* (2006.01)

(52) U.S. Cl.
CPC ........ *F16K 11/074* (2013.01); *F16K 11/0743* (2013.01); *F24D 19/1033* (2013.01); *F24D 19/1024* (2013.01)

(58) Field of Classification Search
USPC ..................................................... 137/625.46
See application file for complete search history.

(56) References Cited

U.S. PATENT DOCUMENTS

| 4,115,276 A | 9/1978 | Kelly |
| 5,584,322 A | 12/1996 | Poschl et al. |
| (Continued) | | |

FOREIGN PATENT DOCUMENTS

| CH | 429 593 A | 1/1967 |
| DE | 44 27 745 A1 | 2/1996 |
| (Continued) | | |

OTHER PUBLICATIONS

International Search Report, dated Mar. 24, 2015, from corresponding PCT Application.

(Continued)

*Primary Examiner* — John Fox
(74) *Attorney, Agent, or Firm* — Young & Thompson

(57) ABSTRACT

A valve for an indoor temperature regulating system, includes a fixed valve housing having at least six valve connections and a valve selector for switching between providing a circulating flow from a first fluid source and a second fluid source thereby enabling fluid of different temperatures to a treatment unit. The valve selector includes a disc plate provided with openings and the valve main body is provided with valve openings connected via channels to the valve connections The valve selector and valve main body are slideable against each other. In the first mode valve openings are in register with lower disc plate openings such that two flow paths connecting the first fluid source with the treatment unit are enabled and in the second mode valve openings are in register with lower disc plate openings such that two flow paths connecting the first fluid source with the treatment unit are enabled.

15 Claims, 9 Drawing Sheets

(56) References Cited

U.S. PATENT DOCUMENTS

| | | | | |
|---|---|---|---|---|
| 5,894,011 | A * | 4/1999 | Prosl | A61M 1/367 |
| | | | | 210/321.72 |
| 6,012,487 | A | 1/2000 | Hauck | |
| 6,058,974 | A * | 5/2000 | Blomgren | F16K 11/074 |
| | | | | 137/625.43 |
| 6,234,207 | B1 * | 5/2001 | Toyama | F16K 11/074 |
| | | | | 137/625.43 |
| 6,550,496 | B2 * | 4/2003 | Tiemann | F16K 11/074 |
| | | | | 137/625.46 |
| 7,028,705 | B1 | 4/2006 | Krechmery et al. | |
| 7,152,620 | B2 * | 12/2006 | Baumgarten | B01D 61/06 |
| | | | | 137/311 |
| 2007/0144594 | A1 | 6/2007 | Moon et al. | |
| 2014/0311179 | A1 | 10/2014 | Kojima et al. | |

FOREIGN PATENT DOCUMENTS

| | | | |
|---|---|---|---|
| EP | 2 378 171 | A1 | 10/2011 |
| GB | 845 187 | A | 8/1960 |
| GB | 2 339 006 | A | 1/2000 |
| WO | 99/14519 | A1 | 3/1999 |
| WO | 2013/001751 | A1 | 1/2013 |

OTHER PUBLICATIONS

European Search Report issued in Application No. 14863705.1, dated May 4, 2017.

* cited by examiner

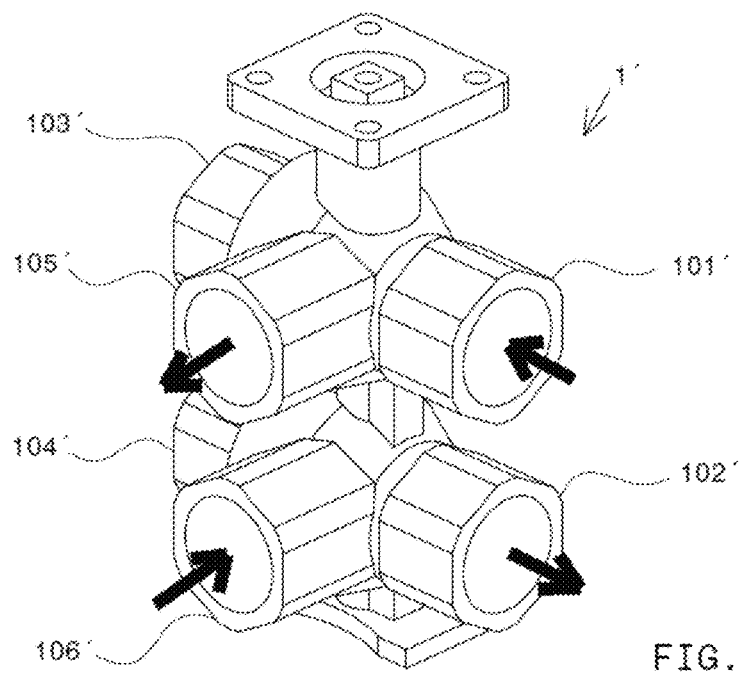
FIG.1a – PRIOR ART
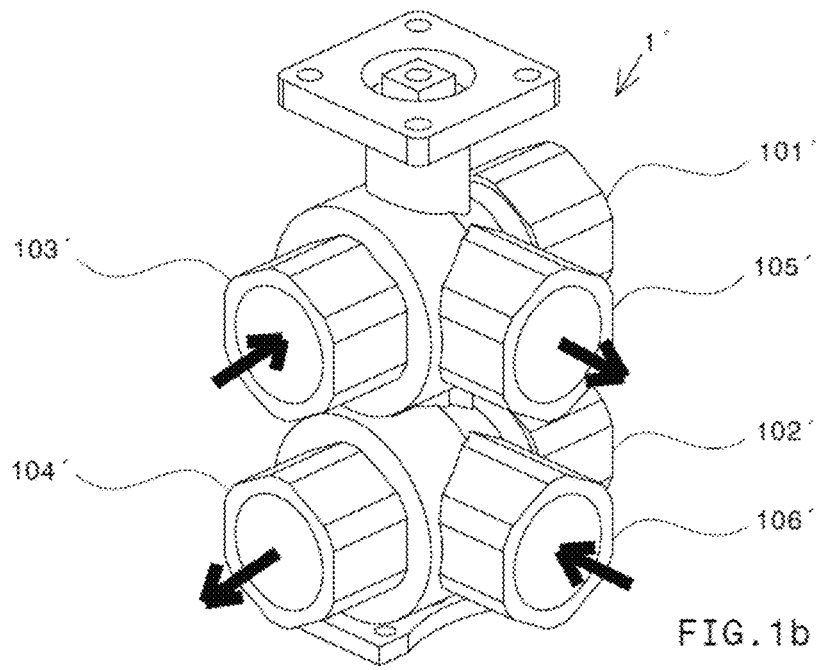
FIG.1b – PRIOR ART

Mode I
a,
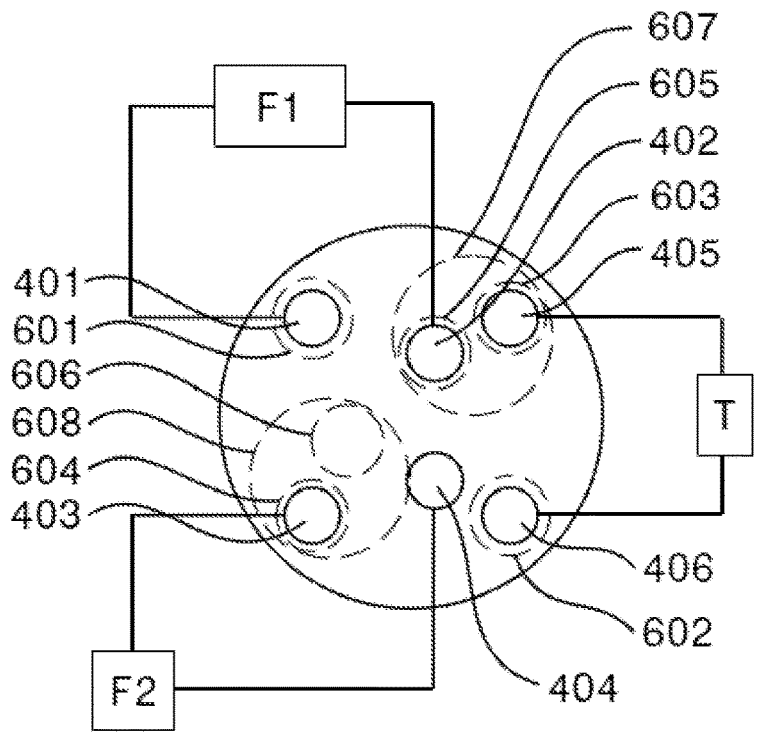
Mode II
b,
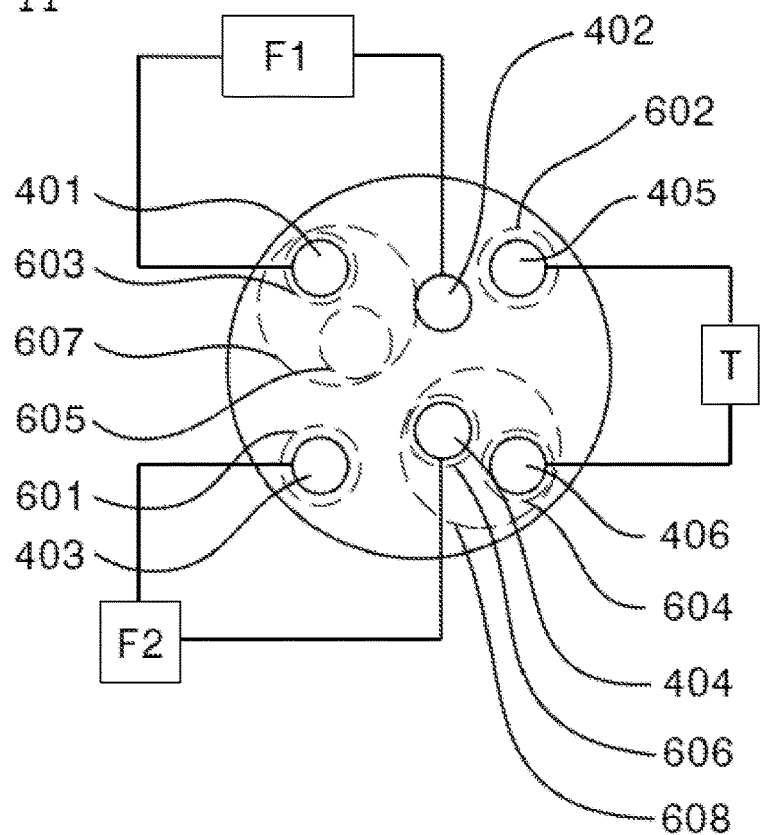
Fig. 8

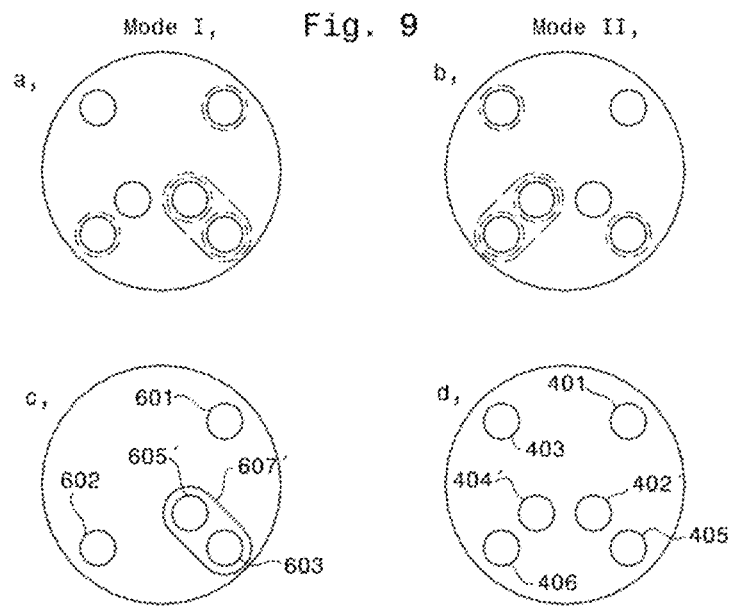
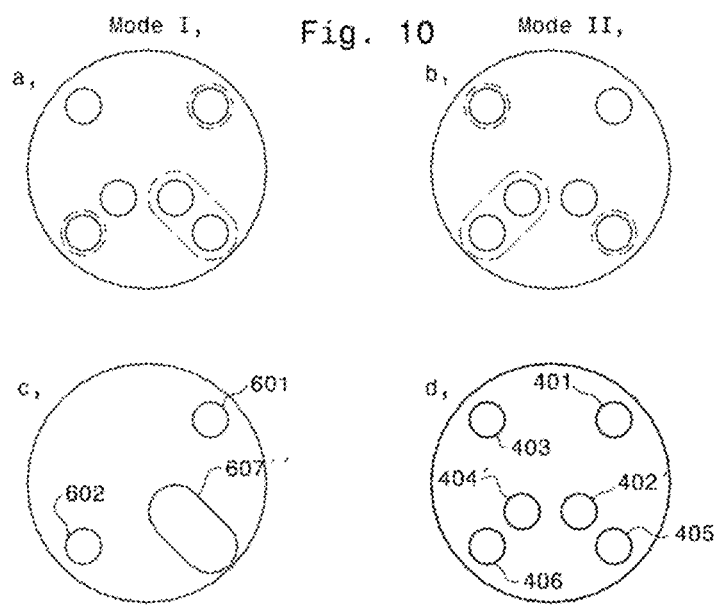

Fig. 11
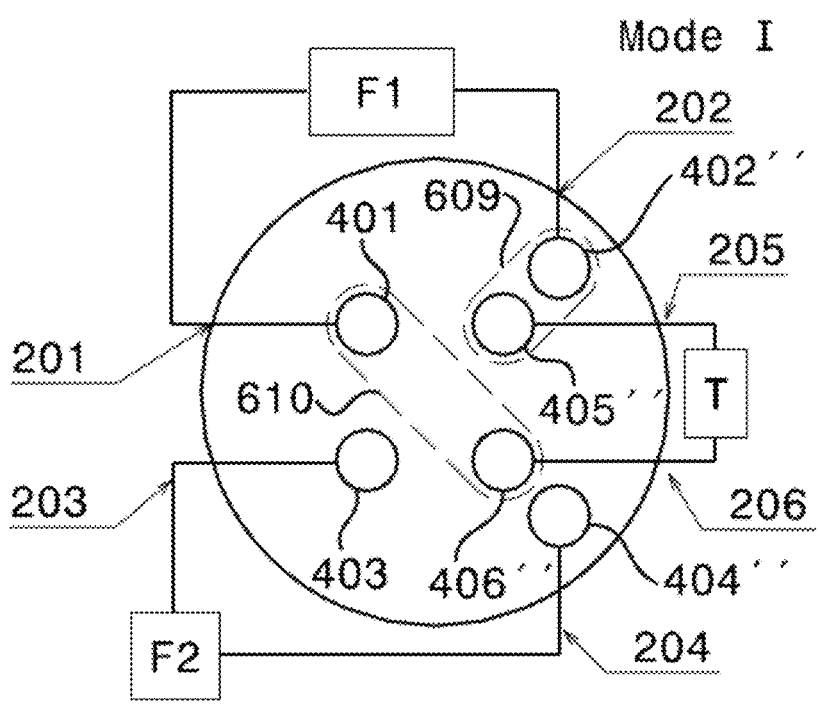
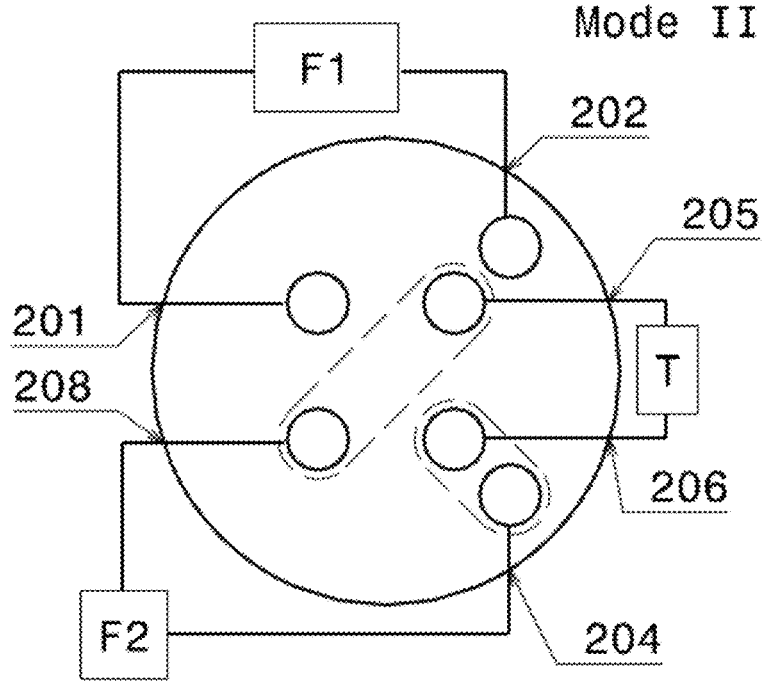

VALVE FOR AN INDOOR TEMPERATURE REGULATING SYSTEM AND AN AIR TEMPERATURE CONDITIONING UNIT COMPRISING SUCH VALVE

TECHNICAL FIELD

The invention relates to a valve arrangement for an indoor temperature regulating system, e.g. a Heating and Ventilating Air Condition (HVAC) system or liquid radiator heating system.

BACKGROUND OF THE INVENTION

In order to control the indoor climate in a building are these buildings usually provided with a heating and/or cooling system, e.g. an air conditioning system such as a Heating and Ventilating Air Condition (HVAC) system or a liquid based radiator system.

A HVAC system comprises a number of different parts such as fresh air inlets admitting fresh air to enter the ventilation system, a fan unit in order to create an air flow in the ventilation ducts, an air temperature conditioning element and an air delivery unit located at the outlet in the room. The air delivery unit may for example be an induction unit in which air flowing out of nozzles, slits or the like creates an induction causing ambient air in the room to co-circulate with the fresh air. The combined air flow may pass through the air temperature conditioning element, e.g. a heat exchanger, which thus may be located in the air delivery unit. The system may further comprise features such as dryers or dampers in order to condition the humidity of the air.

A liquid based radiator system is in general comprised of numerous radiator units placed in different rooms to which the temperature conditioning liquid, in general water, is provided. The liquid is distributed from a central heating unit to be circulated through the radiator units and thereafter returned to the central unit. These systems are in general used for heating purposes and the heat is generally transferred to the air in a room by natural convection of the air in the room. There is also an increased convection from the heating of the air close to the radiator causing the heated air to flow upwards and thus increasing the heat transfer to the air.

In order to provide a desired control of the air temperature from these systems is the control of the temperature in the heat exchanger for the HVAC-system and the radiator for the radiator system essential. In general comprise these devices a temperature regulating media, e.g. water, which is circulated through the device. In many cases may there be at least two sources of temperature conditioning liquid, e.g. a flow of hot water and cold water for the HVAC-system and possibly two heating flows having different temperatures for the radiator system. Hence, there may be a desire to control which flow that shall enter a certain radiator or heat exchanger or group of radiators or heat exchangers. In many cases is the air temperature conditioning device provided with only one circuit for the temperature conditioning liquid flow. In such a design is the inlet to the single device or group of devices controlled by valves to receive and return a flow from either a first or a second temperature conditioning liquid supply. The flow is thus controlled via first and second separate valves for the hot side respectively the cold side. Likewise, the outlet is connected via third and fourth valves to return flow conduits connected to the hot respectively cold side. The flow may thus be controlled to provide a first temperature conditioning by opening the inlet and return flow valve for the first temperature conditioning liquid while valves for the second temperature conditioning liquid supply are closed and a second temperature conditioning liquid may be provided by closing the valves for the first temperature conditioning liquid and opening the valves for circulating the second temperature conditioning liquid supply. This function may be achieved by the use of two separate 3-way valves. However, the same control may be achieved by using a 6-way valve in which the inlet and outlet of the first temperature conditioned liquid is connected to first inlet and outlet openings in the valve and the inlet and outlet of the second temperature conditioned liquid is connected to second inlet and outlet openings in the valve. The valve is further provided with inlet and outlet openings connecting it to the temperature conditioning circuit provided in the heat exchanger. This valve is exemplified in an embodiment by Belimo wherein two 3-way valves are super positioned on top of each other as shown in FIG. 1 such that a 6-way valve is constructed. In the following will this valve be exemplified how it may be used in for example a HVAC system comprising a heating circuit for supplying a heating liquid, a cooling circuit for supplying a cooling liquid and an air treatment unit.

In FIG. 1a is the valve 1 shown when it is in a first mode (I) and configured to provide a heat flow. In this first mode (I) is the upper right connection 101', connected to the outlet of a heating circuit (not shown), open. A heat flow may thus be guided in the valve 1' from the upper right connection 101' to the upper central connection 105' which is connected to the inlet of an air temperature conditioning circuit (not shown),e.g. a heat exchanger in a HVAC unit. The heating liquid flows through the air temperature conditioning circuit and returns to the valve 1' at the lower central connection 106'. The flow is guided in the valve 1' from the lower central connection 106' to the lower right connection 102' which is connected to the inlet of the heating circuit such that the heating liquid will be recirculated to the heating circuit where it will be reconditioned (heated). In this first mode (I) are the upper left connection 103' and the lower left connection 104' closed.

In order to change the function from heating to cooling, the valve may be turned 90 degrees clockwise such that the valve 1' will be in a second mode (II) configured to provide a cold flow through the air temperature conditioning circuit. When the valve is turned 90 degrees will the upper and lower right connections 101', 102', for connecting the heating circuit to the air temperature conditioning circuit, be closed. The turning will also cause the upper left connection 103', connected to the outlet from a cooling circuit (not shown), to open and be connected to the upper central opening 105', i.e. the inlet of the air temperature conditioning circuit. Likewise, the lower left connection 104', connected to the inlet of the cooling circuit, will be opened and connected to the lower central opening 106', i.e. the outlet from the temperature conditioning circuit. The air temperature conditioning circuit will thus be connected to the cooling circuit such that a recirculated cooling flow may be provided. Hence, the change over from providing a heat flow in order to heat an air flow in the HVAC system to provide a cooling flow may be effectuated by a single turn of one actuator of the 6-way valve. Hence, the idea is to use a change over valve which may allow either (or none) of the circuits to be connected.

Hence, there are several ways of providing a system for controlling the flow through an air temperature conditioning unit in a temperature conditioning system.

INVENTION

The invention relates to a valve for an indoor temperature regulating system which enables a compact design and a reliable mechanism in order to a switch between different supply liquids in an air temperature conditioning unit. The temperature regulating system may for example be a Heating and Ventilating Air Condition (HVAC) liquid heating system, e.g. a radiator system or a piping system laid out in the floor or ceiling. The switch of supply liquid may be made by turning a single control pin such that the flow through the valve is changed from guiding a through flow of a first liquid to a through flow of a second liquid. In general is a change of the liquid supplied in the temperature regulating system used for changing between heating and cooling but the liquids could also be used to provide liquids of different temperature for different heating capacity. Hence, the invention is intended to be used for switching between recirculation of liquids from different supplies.

The valve comprises a fixed valve housing having a main body. The main body is provided with at least six valve connections such that it may be connected to two different fluid sources and to a treatment unit. The valve further comprises a valve selector which is moveable relative the valve housing for selectively connecting said valve connections and switch between a first mode (I) and a second mode (II). In the first mode (I) is the valve configured to direct a liquid flow from a first fluid source (F1), connected to a pair of valve connections, through the valve to the treatment unit (T), which is connected to another pair of valve connections, such that a recirculating flow encompassing the first fluid source and treatment unit is enabled. The valve may be switched, by moving the valve selector, to provide a recirculating flow in a second mode (II). In this second mode (II) is the valve configured to guide a flow from a second fluid source (F2), connected to still another pair of valve connections, to the treatment unit (T) such that a recirculating flow encompassing the second fluid source and treatment unit is enabled. Hence, the valve is intended to serve the function of switching between two different sources of liquids for a recirculating flow in the temperature regulating circuit.

The valve selector, which is used for switching between the different fluid sources, comprises a disc plate having a lower disc plate portion provided with openings. The valve main body is provided with valve openings being connected via channels to the valve connections. The valve selector and the valve main body are designed such that they may slide against each other in order to change between the first and second mode. To be noted, there could be further modes included, e.g. a mode wherein no recirculating flow at all is enabled.

The valve is designed such that in the first mode (I) is a recirculating flow between the first fluid source (F1) and the treatment unit (T) enabled. In order to enable this flow should the valve provide for connecting the first and second valve connections, intended to be connected to the first fluid source F1, with the fifth and sixth valve connections intended to be connected to the treatment unit T. This may be realized by designing the valve such that in the first mode I is the first valve opening, connected to the first valve connection, in register with a lower disc plate opening. The valve is further designed such either of the fifth or sixth valve opening, being connected to the fifth valve connection respectively the sixth valve connection, is in register with a lower disc plate opening. This lower disc plate opening is the same lower disc plate opening, or connected to the lower disc plate opening, which is in register with the first valve opening thus in enabling a through flow in the valve. A first flow path from the first valve opening to either of the fifth or sixth valve opening connecting the first fluid source F1 with the treatment unit T is thereby enabled. In addition, the second valve opening, connected to the second valve connection, is in register with a lower disc plate opening. This disc plate opening is the same as, or connected via channels or indentations to another lower disc plate opening, which is in register with the other one of the fifth and sixth valve opening, i.e. the one of the fifth and sixth valve opening not used for the first flow path. Hence, a second flow path from the second valve opening to the fifth or sixth valve opening, connecting the first fluid source F1 with the treatment unit T, is enabled, and In the second mode (II) is a recirculating flow between the second fluid source (F2) and the treatment unit (T) enabled. In this second mode is the valve switched such that the third and fourth valve connections, intended to be connected to the second fluid source, connected to the fifth and sixth valve connections intended to be coupled to the treatment unit (T). Hence, in the second mode is the third valve opening, connected to the third valve connection, in register with a lower disc plate opening. This lower disc plate opening is thus the same, or connected to a lower disc plate opening, which is in register with the fifth or sixth valve opening such that a first flow path from the third valve opening to either of the fifth or sixth valve opening is enabled. Thus, the second fluid source F2 is fluidly connected with the treatment unit T by a first flow path within the valve.

The second mode (II) also comprises a second flow path in which the fourth valve opening, connected to the fourth valve connection, is in register with a lower disc plate opening such that a second flow path from the fourth valve opening to the other one of the fifth or sixth valve opening is enabled and thus connecting the second fluid source F2 with the treatment unit T is enabled via a second flow path.

Hence, the above described valve arrangement may provide for a compact design of the valve. As is obvious for the skilled person in the art, there could be further fluid sources in addition to the two described herein. However, in essentially all temperature regulating or climate control plants for houses and buildings is it sufficient with two different kinds of temperature controlling media, e.g. one for heating and one for cooling.

The valve may be designed to be changed from its first mode (I) to its second mode (II) by a turning motion of the moveable valve selector relative said valve housing. However, the valve could also be designed to change its mode by performing a translational movement of the valve selector relative the valve housing.

The disc plate openings could be designed to open up in a contact surface of the lower disc plate portion. This contact surface is facing the valve main body and the valve openings opens up in a contact surface of said valve main body facing said lower disc plate portion. The valve openings are connected via channels to said valve connections. The contact surface of the lower disc plate portion is in this case facing towards the valve main body and in contact with said contact surface of the valve main body facing the lower disc plate portion. These contact surfaces are designed such that they may slide against each other so as to bring the desired disc plate openings in register with the desired valve openings for the first (I) respective second (II) mode. The surfaces shall of course also be adapted to and provide for a close fit and a tight connection between the lower disc plate openings and the valve openings in order to avoid leakage. The valve may be designed such that the lower disc plate contact surface and said valve main body contact surface are essentially planar.

The openings, channels and/or protrusions in the valve may be designed in a multitude of ways while still achieving a desired flow in the valve and an associated temperature regulating system. The channels may for example be designed such that the first respectively second lower disc plate opening are connected to a first upper disc plate opening respectively a second upper disc plate opening so as to form a first and a second channel through the disc plate. Hence, in this case, will there be a pair of throughgoing holes which form part of a flow path connecting flows through said first upper disc plate opening and said second upper disc plate opening. The flow path, connecting the flows through the first and second upper disc plate opening, may be a space defined by an upper side of said upper portion of the disc plate and a valve cap. The valve cap may be connected to the main valve body and thus forming part of the valve housing.

However, it may also be possible to use a cap which is part of the moving valve selector.

The valve may be designed such that there is a first and second lower disc plate opening whereof one of these openings is designed to be in register with a valve opening connected to the first fluid source (F1) in the first mode (I) and a valve opening connected to the second fluid source (F2) in the second mode (II). Furthermore, the other one of the first and second lower disc plate openings is, in both modes, in register with a valve opening connected to the treatment unit T. The first and second disc plate openings are connected to each other via a channel at least partly formed in a space between the disc plate and a valve cap. The first and second disc plate openings enables a first flow path between the treatment unit (T) and the first or second fluid source (F1 or F2) and a second flow path connecting the treatment unit (T) and the first or second fluid source (F1, F2) in the respective modes is enabled by another pair of disc plate openings. These other lower disc plate portion openings are designed to be in register with another pair of valve openings connecting the first or second fluid source (F1; F2) to the treatment unit (T). This other pair of disc plate openings are connected to each other via a channel completely comprised in the disc plate.

It shall be noted that there is not always a need for separate holes in the disc plate but there may be a single larger hole or opening in the lower disc plate portion (or a throughgoing hole) which connects flow from different valve openings. Hence, one lower disc plate openings may be designed to be in register with two valve openings such that a flow between a pair of valve openings is enabled when the disc plate opening is in register with the valve openings. Hence, depending on the geometry and design of the valve openings could the openings or holes in the lower disc p+late 3 be reduced to only two while still providing for a changing a flow from the first mode to the second mode including a flow through four valve connections, i.e. a pair of connections to the treatment unit and another pair of connections to the first or second fluid source.

The valve could be designed such that the valve main body comprises an upper planar contact surface and side walls being essentially perpendicular to said upper planar contact surface. The side walls are usually a convenient location for the valve connections. The valve main body comprises channels connecting the valve connections in the side walls with respective valve openings in the upper planar surface.

The valve could of course also have valve connections at other locations as will be discussed further below. However, it is in general an advantage to have the valve openings and the valve connections on different sides when designing a valve, at least if it is desired to have a rather compact device. In case it is not very important with the size of the valve, it may be possible to design the valve differently, e.g. could it sometimes be desired to have all connections and the valve selector on one single side and have no protruding parts on other sides.

The channels and flow paths within the valve may be designed in many different ways. The valve selector may be designed to have channels admitting flow of liquid through the valve selector at different levels parallel to the contact surfaces of the valve selector and valve body. The channels could be such that a first flow is guided through the valve selector at a first level, e.g. in a space defined in an indentation in the valve selector and the contact surface of the valve body, connecting a pair of valve openings and a second flow is guided through the valve selector at a second level, e.g. a flow in the upper portion of the disc plate or in between the disc plate and the cap, connecting another, second pair of valve openings.

The valve may be made of several different materials and the valve may for example be designed such that the valve selector comprises or Is made of ceramics. The valve main body may be made from metal.

The valve may also be designed to include further features and may for example include a flow regulating mechanism, e.g. a flow rate adjusting screw or the like arrangement such that the flow rate for the first and/or second recirculating flows may be adjusted.

The valve may include further features in order to provide for an efficient use and smooth change of flow from the first mode to the second mode, e.g. the valve may have a built in slow opening feature such that the flow rate may be regulated by the turning motion of the actuating element of the valve.

This valve is in particular developed in order to provide a space saving and efficient device to be used for an air temperature conditioning unit. The air temperature conditioning unit may for example be a Heating and Ventilating Air Condition (HVAC) system which has been provided with a valve as described herein. In a preferred embodiment is the valve in this case designed such that the valve connections intended to be attached to the treatment unit, i.e. the temperature regulating part of the HVAC-unit, is comprised in the underside of the valve intended to be attached to and facing the HVAC-unit. This will make it possible to design a compact air treatment unit with a control valve which is small and easy to access.

Further advantages and benefits with the present invention may be understood and realized in the following embodiments which are intended to be some examples of how the valve as described above may be designed.

FIGURES

FIG. 1 shows a prior art valve for an air temperature conditioning system

Figure 5A:
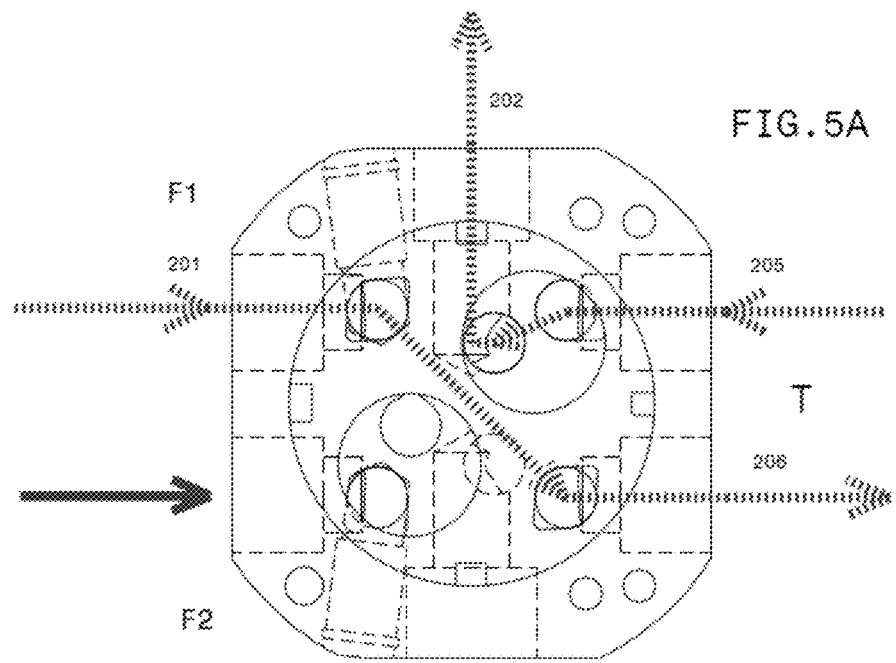
Figure 5B:
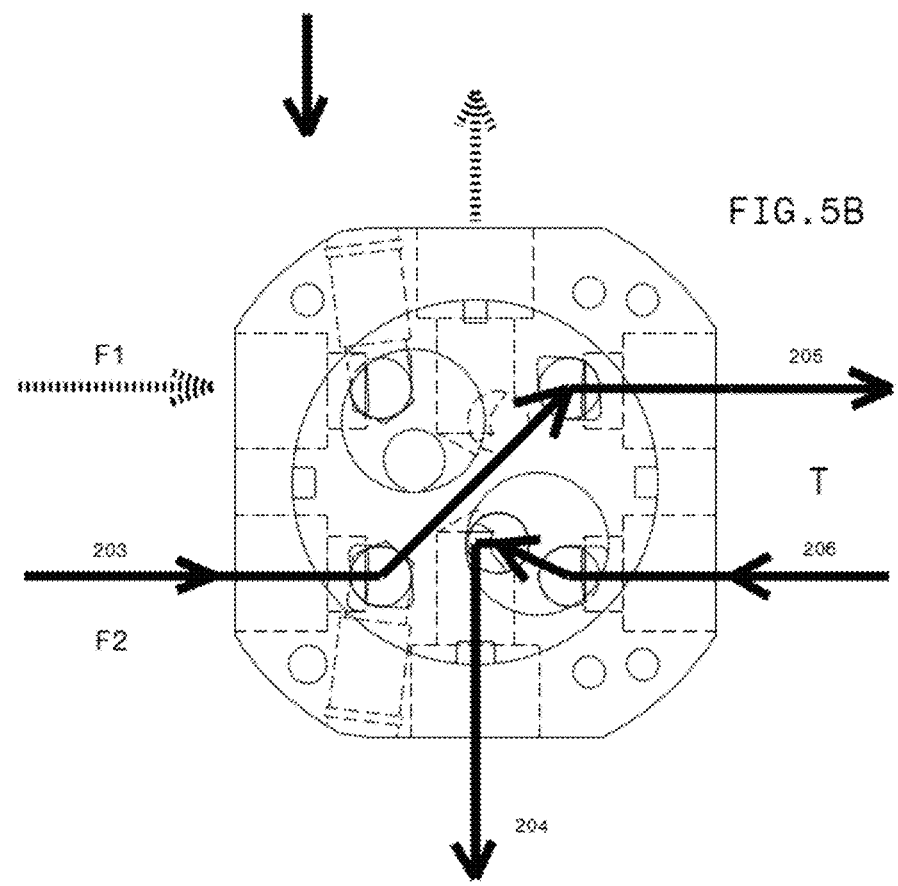
Figure 6:
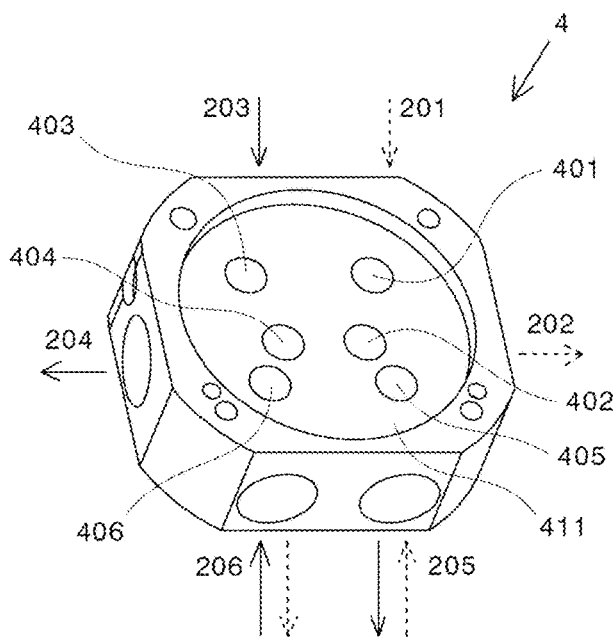
Figure 7:
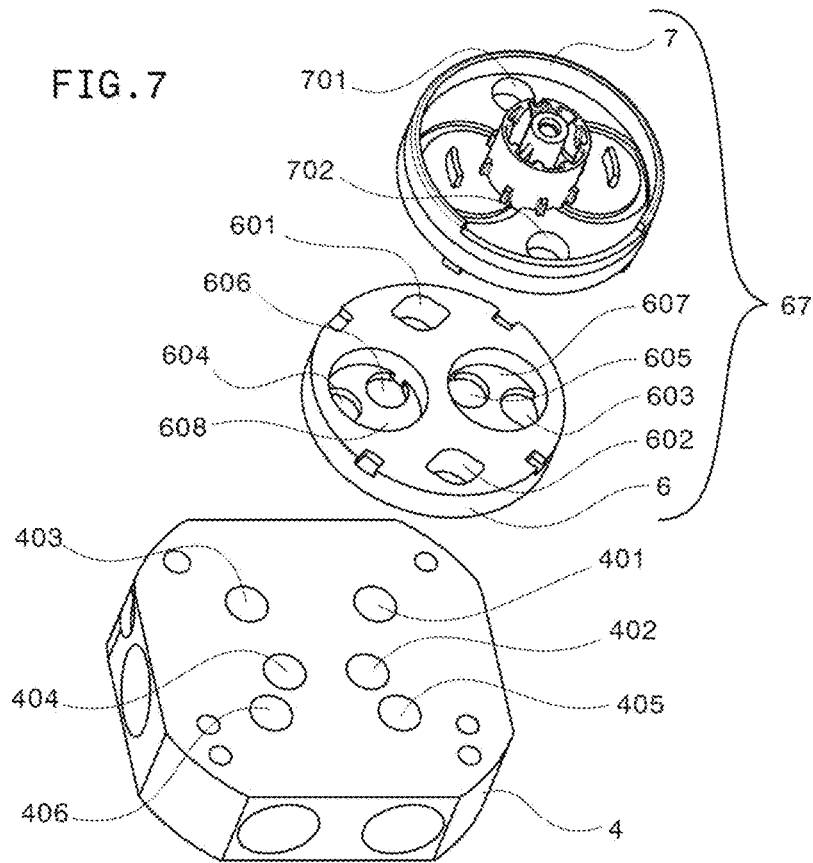

FIG. 5 shows the valve in a first mode (I) in FIG. 5a and a second mode (II) in FIG. 5b; and FIG. 6 shows an isometric view of the valve main body FIG. 7 shows an isometric view of the valve main body together with the lower respectively upper disc plate portions forming the disc plate FIG. 8 discloses a schematic view of the configuration of openings in the lower side of the disc plate and upper side of the valve main body and how the disc plate and valve main body are located relative each other in the first (I) respective second mode (II)

FIG. 9 discloses a schematic view of the configuration of openings in the lower side of the disc plate and upper side of the valve main body according to a second embodiment of the Invention and how the disc plate and valve main body are located relative each other in the first (I) respective second mode (II)

FIG. 10 discloses a schematic view of the configuration of openings in the lower side of the disc plate and upper side of the valve main body according to a third embodiment of the invention and how the disc plate and valve main body are located relative each other in the first (I) respective second mode (II)

Figure 12:
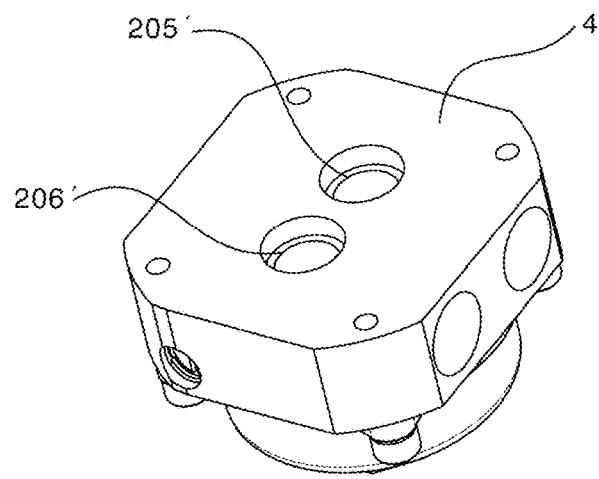

FIG. 12 discloses a schematic view of the configuration of openings in the lower side of the disc plate and upper side of the valve main body according to a fourth embodiment of the invention and how the disc plate and valve main body are located relative each other in the first (I) respective second mode (II)

FIG. 12 discloses an alternative design of the valve connections

Figure 13:
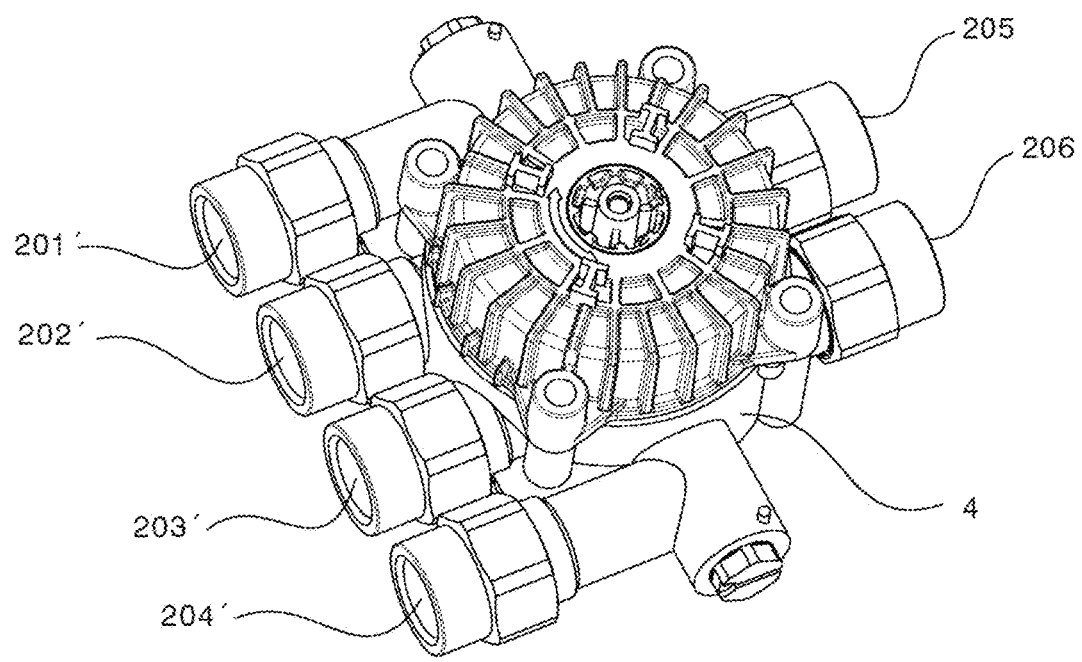

FIG. 13 discloses still an alternative design of the valve connections

DETAILED DESCRIPTION

In FIGS. 2-8 is a first embodiment of the invention disclosed.

Figure 2:
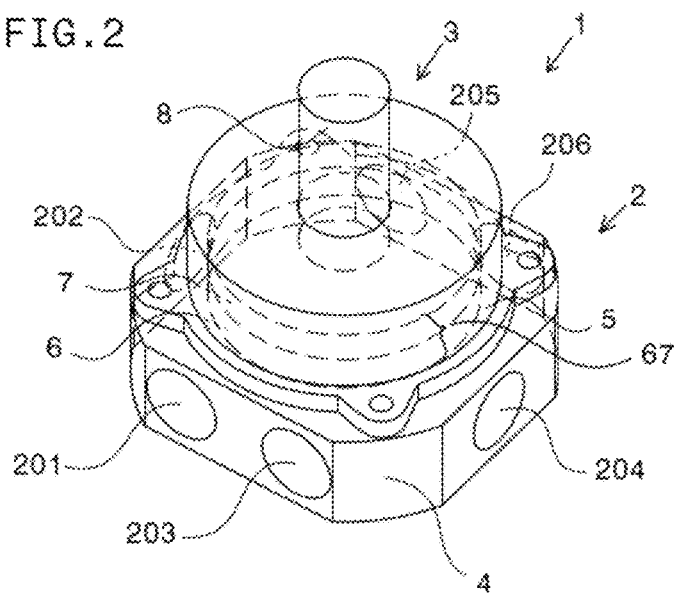
FIG. 2 shows an isometric view of an embodiment of a valve according to the invention
Figure 3:
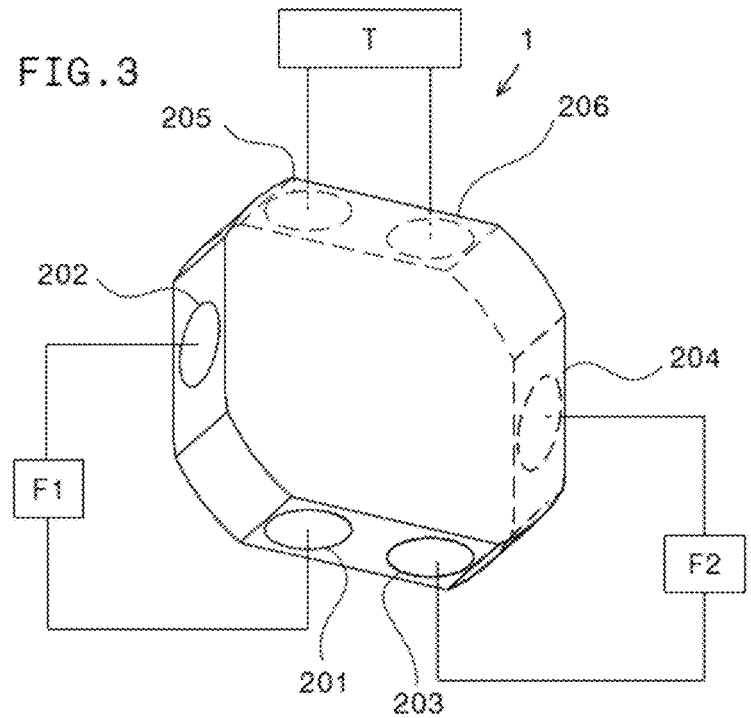
FIG. 3 shows a schematic view of the valve and its connection to an indoor temperature regulating system

FIGS. 2 and 3 aims to give an overview of the main components of the valve 1 and how the valve 1 is intended to be connected to devices in an indoor temperature control system.

In FIG. 2 is shown a valve 1 comprising a fixed valve housing 2 and a valve selector 3 being moveable relative the valve housing 2. The valve housing 2 comprises a main body 4 and a cap 5. The valve housing is further provided with six valve connections 201, 202, 203, 204, 205, 206. How these connections 201-206 may be connected to other units is disclosed in FIG. 3. The valve selector 3 comprises a lower disc plate portion 6, intended to face an upper surface of the valve body 4, and an upper disc plate portion 7 which form part of a disc plate 67. The disc plate 67 is located in a space in the valve housing 2 defined by the valve body 4 and the valve cap 5. The upper disc plate portion 7 is connected to a control pin 8 which stretches through a control pin hole 9 in the valve cap 5 such that the disc plate 67 may be turned by providing a turning force from the outside to the control pin 8. The use of the terms "upper" and "lower" are solely used for making the understanding of the drawings to be understood easier and refers to directions as the figure is oriented in the drawings wherein the valve main body 4 is located at bottom and the disc plate 67 on top of the main body 4. The valve could of course also be used upside down or only turned 90 degrees or be used in whatever desired position.

In FIG. 3 is disclosed a schematic view of how a system using the valve 1 may be configured and how the connections 201-206 of the valve housing 2 may be interconnected with different units in order to work in an indoor temperature regulating system. The first valve connection 201 and the second valve connection 202 are intended to be connected to a first fluid source F1, e.g. a first liquid temperature conditioning circuit for providing a heating flow. The third valve connection 203 and fourth valve connection 204 are intended to be connected to a second fluid source F2, e.g. a second liquid temperature conditioning circuit for providing a cooling flow. The fifth valve connection 205 and sixth valve connection 206 are intended to be connected to a treatment unit T, e.g. an air temperature conditioning unit where it is intended that air which come in contact with the treatment unit T shall be conditioned to a desired temperature.

Figure 4:
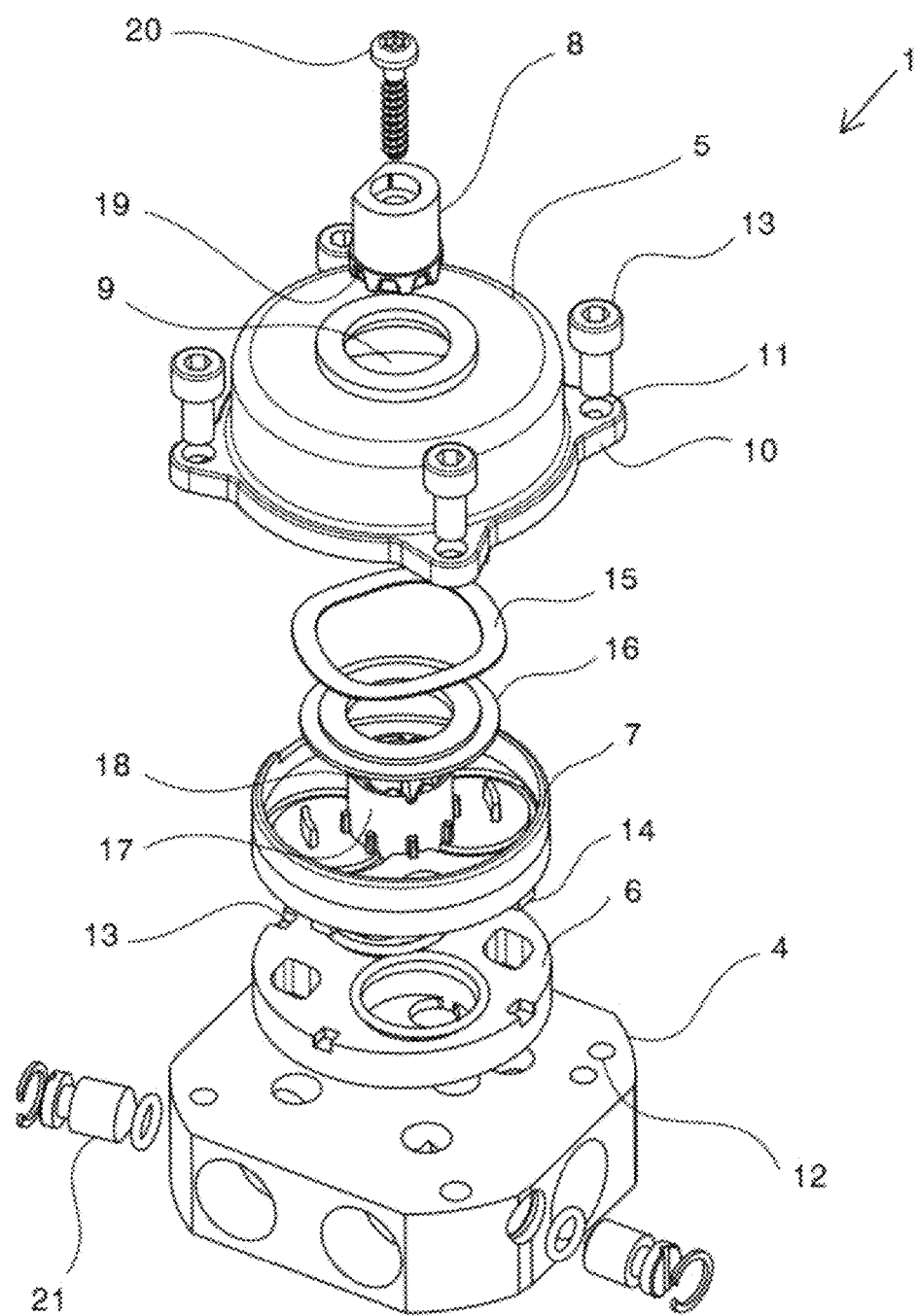
FIG. 4 shows an exploded view of the valve in FIG. 2

In FIG. 4 is shown an exploded view of the valve 1 from FIG. 2 disclosing further details of the valve. The main portions of the fixed valve housing 2 are a valve main body 4, comprising the valve connections 201-206 (see FIG. 3), and a valve cap 5. The main parts of the rotatable valve selector 3 are a lower disc plate portion 6, an upper disc plate portion 7 and a control pin 8 connected to the disc plate 67 through the control pin hole 9 in the cap 5. The disc plate 67 may either be designed as a single piece or be a composite of several pieces, e.g. the lower disc plate portion 6 may be one disc and the upper disc plate portion 7 another disc. In the present embodiment disclosed is the invention exemplified by a disc plate 67 comprising one disc plate which defines the lower disc plate portion 6 which is attached to another disc plate which defines the upper disc plate portion 7.

It is further exemplified how the valve cap 5 may be attached to the valve body 4 by the use of four cap attachment portions 10 provided with cap attachment holes 11 spaced apart from each other equidistantly around valve cap 5. These attachment portions 10 are designed to be attached at the corners of the valve body 4 and the cap attachment holes 11 are designed to be in register with threaded valve body attachment holes 12 such that the cap 5 may be attached to the valve body 4 by the use of screws 13. However, it is obvious that the skilled person may attach the valve cap 5 to the valve body 4 by any suitable means and the specific arrangement for attaching the valve cap 5 to the valve body may thus be made in another way.

As an alternative, the valve cap 5 may be attached to the disc plate 67 such that it rotates with and forms part of the valve selector 3.

It is further shown that the lower disc plate portion 6 is provided with fixing indentations 13 on its upper side intended to fit in with fixing protrusions 14 on the underside of the upper disc plate portion 7 such that the fixing protrusions 14, when engaged with the fixing indentations 13, will cause the lower disc plate portion 6 to rotate with the upper disc plate portion 7 when the control pin 8 is turned. The indentations 13 and protrusions 14 may be designed such that they have different shapes or are irregularly spaced apart from each other such that the lower and upper disc plate portion 6, 7 only may fit in one specific configuration in order to be sure the plates will be fixed to each other in the desired configuration, in order to force the disc plate portions 6, 7 made up by separate disc plates, to stay close to each other may a wave spring ring 15 be used together with a lamella 16 in order to press the upper disc plate portion 7 towards the lower disc plate portion 6. The wave spring ring 15 will be forced by the valve cap 5 to press down the lamella 16 such that the disc plate portions 6, 7 will be pressed against each other. To use such a resilient arrangement may have certain advantages, the arrangement may for example serve as a pressure relief arrangement in case there should be an undesired high pressure from the flows in the valve 1. Since the upper and lower disc plate portion 7, 6 together will define flow paths may non-fixed attachment of the discs allow a small leakage if there is an undesired high pressure. However, the upper and lower disc plate portions 7, 6 could also be rigidly attached to each other and they could also be replaced with a single disc if desired and defining flow channels within the single disc. The rather complex structure of such a disc may however cause it difficult to produce why it is in general more economical to produce a double disc arrangement even though the assembling of the valve 1 may be a little bit more labour intensive.

The upper disc plate portion 7 comprises a control pin attachment portion 17 in the shape of a circular protrusion in the centre of the upper disc 7 protruding upwards. The control pin attachment portion 17 is provided with a saw tooth shaped pattern 18 on the inside of the circular protrusion. This attachment portion saw tooth shaped pattern 18 is designed to fit in with a corresponding control pin saw tooth shaped pattern 19 on the outer side of the control pin 8. Hence, the saw tooth patterns 18, 19 will cause the control pin 8 and the upper disc plate portion 7 to be rotationally fixed to each other when the patterns 18, 19 are engaged such that a turning motion will cause the upper disc plate portion 7 to rotate. The control pin 8 and control pin attachment portion 17 are pressed together to be rotationally engaged by means of a control pin screw 20.

Also disclosed in this figure are a pair of flow adjustment screws 21 which may be screwed into the valve body 4 and reach into channels defined in the valve body 4 such that they may be used to restrict a liquid flow within the valve 1. However, this feature is optional.

The above disclosed features are intended to serve as an example of how a valve may be constructed. However, the specific features may in general be replaced for other features serving the purpose to provide the same function, e.g. may the arrangement for rotationally attaching the disc plate portions 6, 7 to each other be changed for some other arrangement, likewise could the rotational attachment of the control pin 8 to the upper disc plate portion 7 be changed for some other arrangement. In addition is it possible to manufacture two of these parts, e.g. the control pin 8 and the upper disc plate portion 7, or all three parts, i.e. the control pin 8, the upper disc plate portion 7 and the lower disc plate portion 6, as one single piece. Hence, there are a multitude of design options in order to produce a valve having the desired functions which the above described valve is provided with. The valve may of course be provided with further features, e.g. seals where appropriate. The control pin 8 could be designed to have fittings in order to be able to be connected to a motor for turning of the control pin 8 in order to rotate the disc plate 67 such that the valve selector 3 (see FIG. 2) may be moved in order to switch from a first mode (I) in which fluid from the first fluid source F1 is guided by the valve 1 to flow through the treatment unit T and a second mode (II) in which fluid from the second fluid source F2 is guided by the valve arrangement 1 to flow through the treatment unit T (see FIG. 3). The valve 1 may have further modes, e.g. it may be possible to have a mode in which the flow from both the first and second fluid sources F1, F2 are cut off from the treatment unit T.

The different modes will be further explained in the following with reference to FIGS. 5a and 5b.

In FIG. 5a is shown when the valve 1 is in its first mode (I) which in this example is exemplified by connecting hot liquid from the first fluid source F1 to the treatment unit T. In this case is a liquid flow from the first fluid source F1 entering the valve arrangement 1 through the $1^{st}$ valve connection 201 and guided through the valve to the $6^{th}$ valve connection 206 in order to enter the treatment unit T. The liquid will pass through the treatment unit T and thereafter return to the valve 1 through the $5^{th}$ valve connection 205. The fluid will be guided through the valve and leave the valve 1 through the $2^{nd}$ valve connection 202 to be returned to the first fluid source F1. In this embodiment is the valve 1 arranged such that the $3^{rd}$ connection 203 and the $4^{th}$ connection 204 are disconnected such that there may be no flow from the second fluid source F2.

In FIG. 5b is shown when the valve arrangement 1 is in its second mode (II) which in this example is exemplified by connecting cold liquid from the second fluid source F2 to the treatment unit T. In this case is a flow of liquid entering the valve 1 through the $3^{rd}$ valve connection 203 and guided through the valve to the $5^{th}$ valve connection 205 in order to enter the treatment unit T. The liquid will pass through the treatment unit T and thereafter return to the valve 1 through the $6^{th}$ valve connection 206. The fluid will be guided through the valve 1 and leave the valve through the $4^{th}$ valve connection 204 to be returned to the first fluid source F1. In this embodiment is the valve 1 arranged such that the $1^{st}$ connection 201 and the $2^{nd}$ connection 202 are disconnected such that there may be no flow from the first fluid source F1.

A more detailed description of the flow paths and the function of the valve 1 will be explained in association with FIGS. 6-7 and FIG. 2.

In FIG. 6 is an isometric view of the valve body 4 shown comprising the valve connections 201-206. These valve connections are connected to respective valve openings 401-406 comprised in the upper surface of the valve body 4. Hence, valve connection 201 is connected to valve opening 401 via a first channel in the valve body 4, valve connection 202 is connected to valve opening 402 via a second channel in the valve body and so on such that a flow through any of the valve connections 201-206 may be guided to the upper surface of the valve body 4. The valve body is provided with a circular indentation 411 in which the valve openings 401-406 are comprised. The indentation is intended to serve as guiding means for the lower disc plate portion 6 so as to assure the plate will be kept in the desired location. However, it is obvious that the skilled person may use other arrangement for guiding the plate to be in a desired place.

In FIG. 7 is disclosed an exploded view showing the disc plate 67, comprising the lower disc plate portion 6 and the upper disc plate portion 7, and the valve body 4 with associated disc openings 601-606 and valve openings 401-406. The valve openings 401-406 are placed and designed such that they will fit with disc openings 601-606 in the lower disc plate portion 6. How the disc plate 67 and the valve body 4 are designed in order to cooperate to provide a functioning valve will now be explained with reference to FIGS. 4, 6 and 7.

The valve body may be considered to include 3 kinds of valve openings classified by their geometrical configuration. The first kind of valve openings includes the first valve opening 401 and the third valve opening 403; the second kinds of openings comprises the fifth valve opening 405 and the sixth valve opening 406; and the third kind of openings includes the second valve opening 402 and the fourth valve opening 404.

The first and second kind of valve openings 401, 403, 405, 406 are located at the same distance from the rotational centre on an imaginary first (outer) circle of the disc plate 67 and being equidistant placed with respect to each other, i.e.

they have a distance between them corresponding to an angular distance of 90 degrees, i.e. a quarter of a full turn. These first and second kind of valve openings 401, 403, 405, 406 differs in that the first kind of valve openings 401, 403 are located further away from the third kind of valve openings 402, 404 than the second kind of valve openings 405, 406 such that the second and the fifth valve opening 402, 405 forms a first pair of adjacent openings and the fourth and sixth valve openings 404, 406 forms a second pair of adjacent openings.

The third kind of valve openings 402, 404 are located at the same distance from the rotational centre on an imaginary second (inner) circle of the disc plates 67 and thus closer to the rotational centre than the first and second kind of valve openings 401, 403, 405, 406. These third kind of valve openings 402, 404 are spaced apart from each other with an angular distance corresponding to 135 degrees, i.e. ⅜ parts of a full circle.

The third kind of openings 402, 404 are located such that the first kind of valve openings 401, 403 will be two neighboring openings of the valve openings 401, 403, 405, 406 located on the first (outer) circle and, thus, the second kind of valve openings 405, 406 will be the two other neighboring openings of the equidistantly spaced valve openings located at the same first (outer) circle.

The third kind of valve openings 402, 404 are designed to be located such that all the valve openings 401-406 will form an mirror image of an imaginary "mirror" line drawn through the points corresponding to the middle point between the pair of first kind of valve openings 401, 403 and the middle point between the pair of second kind of valve openings 405, 406 (and thus also pass through the rotational centre point for the disc plate 67).

As previously mentioned are valve openings 401-406 connected to a respective valve connection 201-206, i.e. the first valve opening 401 is connected to the first valve connection 201, the second valve opening 402 is connected to the second valve connection 402 etc. In this embodiment are the first kind of valve openings 401, 403 intended to receive an inlet flow (or could alternatively be a return flow) from the respective first fluid source F1 respective second fluid source F2. The second kind of openings 405, 406 are intended to be connected to the in- and outflow to and from the treatment unit T. The third kind of valve openings 402, 404 are intended to receive a return flow from (or could be an inlet flow to) the first fluid source F1 respective second fluid source F2. The valve is thus connected to the fluid sources F1, F2 and the treatment unit as disclosed in FIG. 3.

Hence, the first kind of valve openings 401, 403 and the third kind of openings 402, 404 will always have a through flow from the same fluid source. The first fluid source F1 will flow through the first valve opening 401 (a valve opening of the first kind) and the second valve opening 402 (a valve opening of the second kind) while the second fluid source F2 will flow through the third valve opening 403 (a valve opening of the first kind) and the fourth valve opening 404 (a valve opening of the second kind).

In FIG. 7 is the lower disc plate portion 6 and upper disc plate portion 7 shown together with the valve body 4. The lower disc plate portion 6 is provided with six lower disc plate openings 601-606, which are throughgoing holes thorough the lower disc plate portion 6, and the upper disc plate is provided with 2 upper disc plate openings 701, 702 which forms thoroughgoing holes thorough the upper disc plate portion 7. The lower disc plate openings 601-606 may be grouped such that they represent three different kinds of holes. The first kind of openings comprises the first lower disc plate opening 601 and the second lower disc plate opening 602. These first kind of lower disc plate openings 601, 602 are designed to be in register with the upper disc plate openings 701, 702 when the disc plates 6, 7 are attached to each other such that the first lower and first upper disc plate openings 601, 602 and the second upper and second lower disc plate openings 701, 702 forms through going holes through both the disc plate portion 67. These throughgoing holes are located on the same radial distance from the rotational center point as the first and second kind of valve openings 401, 403 respectively 405, 406 such that they may be in register with these openings depending on the rotational position of the disc plate 67. The openings are designed such that when the valve is in its first mode (I), i.e. when the valve is configured for recirculation of liquid from the first fluid source F1 to the treatment unit T as described in FIG. 5a, are the first through going disc plate openings 601, 701 designed to be in register with the first valve opening 401, connected to the first fluid source F1, and the second through going disc plate openings 602, 702 are designed to be in register with the sixth valve opening 406, connected to the treatment unit T. As is shown in FIG. 5a will this configuration enable a flow path for liquid from a connection to the first fluid source F1, in this case the first valve connection 201, to a connection to the treatment unit T, in this case the sixth valve connection 206, provided that the space between the upper disc plate portion 7 and the valve cap 5 is designed to allow such a flow.

In order to create a circulating flow in the first mode (I) must also the other connections for the first fluid source F1, i.e. the second valve connection 202, and the treatment unit T, i.e. the fifth valve connection 205, be connected to each other which means that a flow between the second valve opening 402 and the fifth valve opening 405 must be enabled. In order to provide this flow will one of the second kind of lower disc plate openings 603, 604 and one of the third kind of lower disc plate openings 605, 606 be used. The second kind of lower disc plate openings 603, 604 are located at the same radius as the first kind of disc plate openings and are located close to the third kind of lower disc plate openings 605, 606 which are located closer to the centre than the first and second kind of openings 601-604 at the same distance from the centre as the third kind of valve openings 402, 404. These lower disc plate openings are grouped such that the third lower disc plate opening 603 and the fifth disc plate opening 605 are adjacent to each other and placed in a first circular indentation area 607 on the upper side of the lower disc plate portion 6. The fourth lower disc plate opening 604 and the sixth disc plate opening 606 are being located adjacent to each other and placed in a second circular indentation area 608 on the upper side of the lower disc plate portion 6. In the first valve mode (I) will a flow path be established by the use of the first indentation area 607 being located such that it enables a flow through the second valve opening 432 to also flow through the fifth valve opening 405 by fitting the second valve opening 402 with the fifth lower disc plate opening 605 and the fifth valve opening 405 with the third lower disc plate opening 603.

In the second valve mode (II), i.e. when the disc plate 67 is turned 90 degrees, will a flow path be established by the use of the second indentation area 608 being located such that it enables a flow through the fourth valve opening 404 to also flow through the sixth valve opening 406 by fitting the fourth valve opening 404 with the sixth lower disc plate opening 606 and the sixth valve opening 406 with the fourth lower disc plate opening 604.

The rather specific design is intended to show how this embodiment works and is based on the idea that the turning of a quarter of a full turn, i.e. 90 degrees, is desired to change the valve from its first mode to its second mode. To be noted, in the specific design as disclosed in this example will the configuration of the disc plate openings 603, 605 in the first indentation area 607 respectively the disc plate openings 604, 606 in the second indentation area 608 respectively 608 only fit for one of the configurations of neighboring valve openings, i.e. either for the neighboring pair comprising the second and fifth valve openings 402, 405 or the pair comprising the fourth and sixth valve openings 404, 406. This feature is due to the difference in the angular distance of the third kind of valve openings (i.e. the inner valve openings 402, 404), which is 135 degrees compared to the distance between the first and second kind of valve openings (i.e. the outer valve openings 401, 403, 405, 406; which are equidistantly spaced apart from each other, i.e. an angular distance corresponding to 90 degrees. This will be further discussed in following paragraphs. However, if the first and second kind of valve openings not are equidistantly located from each other on the first (outer) imaginary circle but, for example, the angular distance between the first kind of valve openings, as well as the angular distance between the second kind of openings, only be 60 degrees (while the same kind of openings still provide mirror images of each other with respect to the earlier mentioned mirror image line) should a turning of 60 degrees be sufficient. In this case should of course also the third kind of valve openings be adapted to the change (alternatively, or in addition, the disc plate openings corresponding to the third kind openings). It is of course also possible to have a non symmetrical arrangement of openings in the valve body 4 and/or the lower disc plate portion 6. However, asymmetric geometries in either the valve body 4 or the lower disc plate may imply the need to use further openings in either of these entities. It shall also be noted that a symmetric configuration does not itself imply that a reduced number of openings may be used.

As for instance in the present valve, the openings are symmetrical concerning the mirror image line. However, concerning rotational symmetries are they not equal. The third kind of openings 402, 404 have an angular distance of 135 degrees (or, alternatively, 215 degrees if turned the other way around), i.e. there is a need to turn the lower disc plate at least 135 degrees to change disc plate opening of the third kind (i.e. the fifth or sixth disc plate opening, the inner openings) 605, 606 from being registered with an inner, third kind valve opening, e.g. the second valve opening 402, to be registered with the other inner, third kind valve opening, e.g. the fourth valve opening 404. The angular distance between the valve openings of the first kind 401, 403, as well as between the openings of the second kind 405, 406, is however 90 degrees.

This means that the same inner disc plate openings 605, 606 of the present design, which are displaced by 135 degrees, may not be used for enabling the flow in the first mode (I) as well as in the second mode (II) of the valve since the outer openings are equidistantly placed around an outer circle, i.e. displaced by 90 degrees. The indention areas 607, 608 are thus designed such that the first indentation area 607 is connecting the first fluid source F1 with the treatment unit T by providing for a flow from the second valve opening 402 to the fifth valve opening 405. In the second mode, i.e. when the disc plate is turned 90 degrees, is the second indentation area 608 connecting the second fluid source F2 with the treatment unit T by providing for a flow from the fourth valve opening 404 to the sixth valve opening 406.

Hence, there is thus a need of having 6 disc plate openings in the present design configuration even though other possibilities could be possible as will be discussed further below.

In FIG. 8 is disclosed a schematic view of the valve when it is in the first mode (I), as disclosed in FIG. 8a, and when it is in the second mode (II), as disclosed in FIG. 8b.

In FIG. 8a is thus disclosed how the valve is set such that the first fluid source F1 is connected to the treatment unit T and a circulating is enabled. A first flow connection is enabled between the first fluid source F1 and the treatment unit T by the second and fifth valve openings 402, 405 which are in register with the fifth respectively third lower disc plate openings 605, 603. This flow will pass through the space created in the indentation area 607 in the lower disc plate portion 6 which is sealed by the upper disc plate portion 7 (See also FIG. 7). A second flow connection between the first fluid source F1 and the treatment unit T is enabled by the first and sixth valve openings 401, 406 which are in register with the first and second lower disc plate openings 601, 602. These openings are also in register with the first respectively second upper disc plate openings 701, 702 (see FIG. 7) such that a flow will pass through a space defined by the upper disc plate portion 7 and the valve cap 5 (see FIG. 4).

In FIG. 8b is disclosed when the valve 1 is set in its second mode (II) wherein the second fluid source F2 is connected to the treatment unit T. The switch between the two modes is made by turning the valve selector 3 (see FIG. 2) 90 degrees. A first flow connection is enabled between the second fluid source F2 and the treatment unit T by the fourth and sixth valve openings 404, 406 which are in register with the sixth respectively fourth lower disc plate openings 606, 604 and a flow in the indentation area 607 analogous to the flow described in FIG. 8a is created. A second flow connection between the second fluid source F2 and the treatment unit T is enabled by the third and fifth valve openings 403, 405 which are in register with the first and second lower disc plate openings 601, 602 and the first respectively second upper disc plate openings 701, 702 (see FIG. 7. Hence, the same space defined by the upper disc plate portion 7 and the valve cap 5 which was used for the second flow path in the first mode (I) is used once again for the second flow path also in the second mode.

In FIGS. 9 and 10 are disclosed some changes of the design of the configurations of the valve openings and the lower disc plate openings according to a second respectively third embodiment of the invention. However, the flow will follow essentially the same paths as described in FIG. 8 why the flow paths not will be explained in detail and the first fluid source, second fluid source and the treatment unit T are connected in the same way as in FIG. 8.

In FIGS. 9 and 10 is the first mode disclosed in FIG. 9a respectively 10a and the second mode disclosed in FIG. 9b respectively 10b. The configuration of the lower disc plate holes are disclosed in FIG. 9c respectively 10c and the valve openings are shown in FIGS. 9d and 10d.

In the second and third embodiment, as shown in FIGS. 9c and 10c, have the inner valve openings 402' and 404' been modified such that they have been relocated to have an angular distance between them of 90 degrees, i.e. the same distance as the outer valve openings 401, 403, 405, 406. This change imply that there is no need to have both indentation areas 607, 608 as with its associated lower disc plate openings as in the first embodiment disclosed in FIGS. 2-8. Hence, a single modified indentation area 607' may be used to provide a connecting flow in the first mode (I) as well as in the second mode (II) by turning the disc plate 67 90 degrees. The configuration of the valve openings 401, 402', 403, 404', 405 and 406 in the second and third embodiment are identical, i.e. FIGS. 9*d* and 10*d* are the same.

However, in FIG. 9*c* has the fifth lower disc plate opening 605' been relocated somewhat compared to the fifth lower disc plate opening 605 in FIG. 8 in order to fit the relocated second and fourth valve openings 402', 404' in the first (I) and second (II) modes when the disc plate 67 is turned. Hence, the modification of the second and fourth valve openings 402', 404' and the first indentation area 607' and its associated fifth lower disc plate hole 605' makes it possible to not need the second indentation area 608 or any of its associated lower disc plate openings (see FIG. 8).

In FIG. 10 is there still another simplification of the lower disc plate 6. The indention area 607 from FIG. 8 has been replaced with a single opening 607" which is large enough to cover both neighbouring valve openings, i.e. either 402' and 405 or 404' and 406. Hence, a single opening 607" as disclosed in FIG. 10*c* replaces the indentation area 607' with its associated third lower disc plate opening 603 and (modified) fifth lower disc plate opening 605'.

In FIG. 11 is still another embodiment of the invention shown. In this embodiment has the number of openings in the lower disc plate portion 6 been reduced still such that there are only two holes 609, 610. The geometrical configuration of the valve openings 401, 402", 403, 404", 405", 406" is in this embodiment exemplified to be located at the same locations as the valve openings 401, 402', 403, 404', 405 and 406 in FIGS. 9*d* and 10*d*. However, the flow path within the valve main body 4 has been modified compared to the design in FIGS. 8 to 10. In FIG. 11 is the fifth and sixth valve openings 405", 406" connected to the treatment unit T via the fifth valve connection 205 respectively sixth valve connection 206, located at the inner circle, i.e. the more centrally located valve openings of the openings forming the neighbouring pairs of the second and fifth valve openings 402", 405" respectively the fourth and sixth valve openings 404", 406'. This arrangement will thus facilitate an arrangement of the lower disc plate portion 6 being provided with only two openings, first lower disc plate opening 609 and second lower disc plate opening 610. The other valve connections 201, 202, 203, 204 are connected to corresponding valve openings 401, 402", 403, 404".

In the first mode (I) is the shorter first flow guide hole 609 covering the second and fifth valve openings 402", 405" and the longer, second flow guide hole is covering and connecting first and sixth valve openings 401, 406" such that a closed circuit for the first fluid source F1 and treatment unit T is enabled. The valve may easily be changed to its second mode (II) by turning the disc plate 67 90 degrees such that the shorter first flow guide hole 609 covers the fourth and sixth valve openings 404", 406" and the longer, second flow guide hole 610 covers and connects third and fifth valve openings 403, 405" such that a closed circuit for the second fluid source F2 and treatment unit T is enabled.

To be noted, in this case are the flow connections made by the first and second flow guide holes 609, 610 which implies that there is no need to provide flow paths at different levels. The flow may thus be enables by flows on the same level and there is thus no need for any openings or holes in other parts, i.e. the upper disc plate portion may be made without any openings holes or indentations and may simply be a solid disc portion defining the flow space of the flow guide holes.

It is obvious for the skilled person in the art that the configuration of valve openings and disc plate openings and protrusions therein may be different to the design described herein, they may differ in shape and in number as described above and may be symmetrically configured or designed in an asymmetrical way. Hence, there may be a number of different design options for achieving a flow in which a first flow is intended to flow at one level in the disc plate arrangement 67 and another flow to flow at another level or even provide a flow at the same level as disclosed in the fourth embodiment in FIG. 11.

Neither is the configuration of the valve connections necessarily to be comprised in the side walls. In FIG. 12 is disclosed an alternative design of the valve main body 4 in which the fifth valve connection 205' and sixth valve connection 206' intended to be attached to the treatment unit T are comprised in the underside of the main body. This arrangement may be useful for providing a compact design of the valve and a space saving attachment to a treatment unit T, e.g. may the valve be mounted to the treatment unit T with its underside in close contact with the treatment unit. Hence, at least some of the valve connections may be located on other locations instead of providing all valve connections on the sides.

In FIG. 13 is still a further embodiment of how the valve connections may be changed depending on special requirements and desires to be able to fit on a treatment unit T. In this case are the fifth and sixth valve connections 205, 206 intended to be attached to the treatment unit T located on one side as in previously shown while the first to the fourth valve connections 201', 202', 203', 204', which are intended to be connected to the in-respectively outflow of the first and second fluid source F1, F2, are comprised in the opposite side.

The invention claimed is:

1. A valve (1) for an indoor temperature regulating system wherein said valve (1) comprises a fixed valve housing (2) having a main body (4) provided with at least six valve connections (201-206, 205', 206') and a valve selector (3) being moveable relative the valve housing (2) for selectively connecting said valve connections (201-206, 205', 206') such that the valve (1) may be switched by moving the valve selector (3) to provide a circulating flow in a first mode (I), in which a first fluid source F1, connected to the first valve connection (201) and the second valve connection (202), is connected to a treatment unit (T) connected to the fifth valve connection (205, 205') and the sixth valve connection (206, 206'), and a second mode (II), in which a second fluid source (F2), connected to the third valve connection (203) and the fourth valve connection (204), is connected to the treatment unit (T) connected to the fifth valve connection (205, 205') and the sixth valve connection (206, 206') wherein said valve selector (3) comprises a disc plate (67) having a lower disc plate portion (6) provided with openings (601-606, 605', 607", 609, 610) and said valve main body (4) is provided with valve openings (401-406, 402', 404', 405', 406', 402", 404") being connected via channels to said valve connections (201-206, 205', 206'), said valve selector (3) and valve main body (4) being designed such that they may slide against each other, said valve (1) being designed such that in the first mode (I) the first valve opening (401), connected to the first valve connection (201), is in register with a lower disc plate opening (601, 610) and the fifth or sixth valve opening (405, 405' or 406, 406'), being connected to the fifth valve connection (205, 205') respectively the sixth valve connection (206, 206'), is in register with a lower disc plate opening (602, 610) such that a first flow path from the first valve opening (401) to either of the fifth or sixth valve opening (405 or 406) connecting the first fluid source F1 with the treatment unit T is enabled, and the second valve opening (402, 402', 402"), connected to the second valve connection (202), is in register with a lower disc plate opening (605, 605', 607", 609) such that a second flow path from the second valve opening (402) to the other one of the fifth or sixth valve opening (405 or 406) connecting the first fluid source F1 with the treatment unit T is enabled, and in the second mode (II) the third valve opening (403), connected to the third valve connection (203), is in register with a lower disc plate opening (601, 610) and the fifth or sixth valve opening (405, 405' or 406, 406') is in register with a lower disc plate opening (602, 610) such that a first flow path from the third valve opening (403) to either of the fifth or sixth valve opening (405 or 406) connecting the second fluid source F2 with the treatment unit T is enabled, and the fourth valve opening (404, 404', 404"), connected to the fourth valve connection (204), is in register with a lower disc plate opening (606, 605', 607", 609) such that a second flow path from the fourth valve opening (404, 404', 404") to the other one of the fifth or sixth valve opening (405, 405' or 406, 406') connecting the second fluid source F2 with the treatment unit T is enabled.

2. The valve (1) according to claim 1, wherein said valve is changed from its first mode (I) to its second mode (II) by a turning motion of the moveable valve selector (3) relative said valve housing (2).

3. The valve (1) according to claim 1, wherein said lower disc plate openings (601-606, 605', 607", 609, 610) open up in a contact surface (6') of said lower disc plate portion (6) facing said valve main body (4), and said valve openings (401-406, 402', 404', 405', 406', 402", 404") open up in a contact surface (4') of said valve main body (4) facing said lower disc plate portion (6) and are connected via channels to said valve connections (201-206, 205', 206'), said contact surface (6') of the lower disc plate portion (6) being in contact with said contact surface (4') of the valve main body (4), said contact surfaces (4', 6') being designed such that they may slide against each other so as to bring the desired lower disc plate openings (601-606, 605', 607", 609, 610) in register with the desired valve openings (401-406, 402', 404', 405', 406', 402", 404") for the first (I) respective second (II) mode.

4. The valve (1) according to claim 3, wherein said lower disc plate contact surface (6') and said valve main body contact surface (4') are essentially planar.

5. The valve (1) according to claim 3, wherein said valve selector (3) is designed to have channels admitting flow of liquid through the valve selector (3) at different levels parallel to the contact surfaces (4', 6') of the valve selector (3) and valve body (4) such that a first flow is guided through the valve selector (3) at a first level connecting a pair of valve openings (401-406, 402', 404', 405', 406', 402", 404") and a second flow is guided through the valve selector (3) at a second level connecting another, second pair of valve openings (401-406, 402', 404', 405', 406', 402", 404").

6. The valve (1) according to claim 1, wherein a first lower disc plate opening (601) respectively a second lower disc plate opening (602) are connected to a first upper disc plate opening (701) respectively a second upper disc plate opening (702) comprised in a disc plate upper portion (7) so as to form a first and a second channel through the disc plate (67), said disc plate upper portion (7) being designed to form part of a flow path connecting flows through said first upper disc plate opening (701) and said second upper disc plate opening (702).

7. The valve according to claim 6, wherein said flow path connecting flows through said first upper disc plate opening (701) and said second upper disc plate opening (702) is a space defined by said upper portion (7) of the disc plate (67) and a valve cap (5) connected to the main valve body (4) thus forming part of the valve housing (2).

8. The valve (1) according to claim 1, wherein a first lower disc plate opening (601) and a second lower disc plate opening (602) are designed to be in register with a valve opening (401, 402, 402' or 402") connected to the first fluid source (F1) in the first mode (I) and a valve opening (403, 404, 404' or 404") connected to the second fluid source (F2) in the second mode (II) respectively, in both modes, a valve opening (405, 406, 405' or 406') connected to the treatment unit whereby said first and second lower disc plate openings (601, 602) are connected to each other via a channel at least partly formed in a space between the disc plate (67) and a valve cap (5) such that a first flow path is enabled connecting the treatment unit (T) and the first or second fluid source (F1 or F2), and a second flow path connecting the treatment unit (T) and the first or second fluid source (F1, F2) in the respective modes is enabled by another pair of lower disc plate openings (603, 605; 603, 605'; or 604, 606) designed to be in register with another valve opening (401, 402, 402' or 402"; 403, 404, 404' or 404") connected to the first or second fluid source (F1; F2) and another valve opening (405, 406, 405' or 406') connected to the treatment unit (T) whereby said other pair of lower disc plate openings (603, 605; 603, 605'; or 604, 606) are connected to each other via a channel completely comprised in the disc plate (67).

9. The valve (1) according to claim 1, wherein one or several lower disc plate openings (608, 609, 610) are designed to be in register with two valve openings (401-406, 402', 404', 405', 406', 402", 404") such that a flow between a pair of valve openings is enabled when the lower disc plate opening (608, 609, 610) is in register with the valve openings (401-406, 402', 404', 405', 406', 402", 404").

10. The valve (1) according to claim 1, wherein said valve body (4) comprises an upper planar contact surface (4') and side walls being essentially perpendicular to said upper planar contact surface (4'), said side walls comprising said valve connections (201-206) whereby said valve body (4) comprises channels through the valve body (4) connecting the valve connections (201) in the side walls with respective valve openings (401-406) in the upper planar surface.

11. The valve (1) according to claim 1, wherein said valve selector (3) comprises or is made of ceramics.

12. The valve (1) according to claim 1, wherein said valve arrangement comprises a flow regulating feature such that the flow rate for said first and second recirculating flows may be adjusted.

13. The valve (1) according to claim 1, wherein said valve has a built in slow opening feature such that the flow rate may be regulated by the turning motion of the actuating element of the valve.

14. An air temperature conditioning unit in a Heating and Ventilating Air Condition (HVAC) system, wherein said air temperature conditioning unit comprises a valve according to claim 1.

15. The air temperature conditioning unit according to claim 14, wherein said valve (1) is attached to a treatment unit (T) by valve connections (205', 206') provided on the underside of the valve (1).

* * * * *